(12) United States Patent
Ishibashi et al.

(10) Patent No.: US 6,360,152 B1
(45) Date of Patent: Mar. 19, 2002

(54) VEHICLE-CONTROL COMMUNICATION SYSTEM

(75) Inventors: Koichi Ishibashi; Shoichiro Seno, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/436,257

(22) Filed: Nov. 9, 1999

(30) Foreign Application Priority Data

Mar. 31, 1999 (JP) ............................................. 11-093535

(51) Int. Cl.$^7$ .............................. G06F 7/00; G05B 9/02; H04L 9/00
(52) U.S. Cl. ........................... 701/48; 701/45; 180/268; 380/283
(58) Field of Search .............................. 701/33, 48, 41, 701/29, 45, 1, 54, 114, 102, 36; 709/103; 180/268; 713/151, 156; 380/283; 340/3.1, 3.44, 459; 307/9.1; 714/11; 370/235

(56) References Cited

U.S. PATENT DOCUMENTS

| | | | | |
|---|---|---|---|---|
| 5,202,822 A | * | 4/1993 | McLaughlin et al. | 364/187 |
| 5,369,581 A | * | 11/1994 | Ohsuga et al. | 364/424.01 |
| 5,369,584 A | * | 11/1994 | Kajiwara | 364/424.05 |
| 5,832,397 A | * | 11/1998 | Yoshida et al. | 701/29 |
| 5,835,873 A | * | 11/1998 | Darby et al. | 701/45 |
| 5,872,847 A | * | 2/1999 | Boyle et al. | 380/25 |
| 5,949,879 A | * | 9/1999 | Berson et al. | 380/23 |
| 5,974,351 A | * | 10/1999 | Croft et al. | 701/48 |
| 5,991,793 A | * | 11/1999 | Mukaida et al. | 109/104 |
| 6,012,004 A | * | 1/2000 | Sugano et al. | 701/33 |
| 6,038,500 A | * | 3/2000 | Weiss | 701/22 |
| 6,202,012 B1 | * | 3/2001 | Gile et al. | 701/48 |

FOREIGN PATENT DOCUMENTS

| | | |
|---|---|---|
| JP | A 62237895 | 10/1987 |
| JP | A 4114203 | 4/1992 |

* cited by examiner

Primary Examiner—Tan Nguyen
Assistant Examiner—Dalena Tran

(57) ABSTRACT

A vehicle-control communication system, in which a plurality of control function units such as ECI (engine control) are separated into an I/O processing function and an operation control function, and the I/O processing function for each control function unit comprises I/O processing nodes, while the operation control function is formed as one of the operation control nodes for each of vehicle control groups each obtained by integrating control function units with a relation therebetween into one group. Transmit-receive of information within each of the vehicle control groups is executed via any of first communication lines, while transmit-receive of information between the vehicle control groups is executed via a second communication line.

26 Claims, 10 Drawing Sheets

44a NODE CONSTRUCTION TABLE

| NODE TYPE | PRIORITY | NECESSARY BANDWIDTH (CYCLE)[msec] |
|---|---|---|
| I/O PROCESSING NODE 31a (ECI) | HIGH | 10 |
| I/O PROCESSING NODE 31b (AT) | HIGH | 10 |
| I/O PROCESSING NODE 31c (DBW) | LOW | 20 |
| I/O PROCESSING NODE 32a (ABS) | HIGH | 20 |
| I/O PROCESSING NODE 32b (TCS) | MIDDLE | 20 |
| I/O PROCESSING NODE 33a (EPS) | HIGH | 30 |
| I/O PROCESSING NODE 33b (ACC) | MIDDLE | 30 |
| OPERATION CONTROL NODE 21 | LOW | 0 |
| OPERATION CONTROL NODE 22 | LOW | 0 |
| OPERATION CONTROL NODE 23 | LOW | 0 |

FIG.5

44b TRANSMISSION CONTROL TABLE

| TRANSMISSION CYCLE | NODE | TRANSMISSION HISTORY | NODE STATUS |
|---|---|---|---|
| 10 | I/O PROCESSING NODE 31a (ECI) | TRANSMITTED | NORMAL |
| 10 | I/O PROCESSING NODE 31b (AT) | TRANSMITTED | NORMAL |
| 20 | I/O PROCESSING NODE 31c (DBW) | BEING TRANSMISSION | NORMAL |
| 20 | I/O PROCESSING NODE 32a (ABS) | NOT-YET TRANSMITTED | NORMAL |
| 20 | I/O PROCESSING NODE 32b (TCS) | NOT-YET TRANSMITTED | NORMAL |
| 30 | I/O PROCESSING NODE 33a (EPS) | NOT-YET TRANSMITTED | NORMAL |
| 30 | I/O PROCESSING NODE 33b (ACC) | NOT-YET TRANSMITTED | NORMAL |
| 0 | OPERATION CONTROL NODE 21 | — | NORMAL |
| 0 | OPERATION CONTROL NODE 22 | — | NORMAL |
| 0 | OPERATION CONTROL NODE 23 | — | NORMAL |

FIG.6

| NODE TYPE | ENCRYPTION KEY |
|---|---|
| OPERATION CONTROL NODE 21 | K1 (FOR ECI CONTROL) |
| | K2 (FOR AT CONTROL) |
| | K3 (FOR DBW CONTROL) |

FIG.11A

| NODE TYPE | ENCRYPTION KEY |
|---|---|
| I/O PROCESSING NODE 31a | K1 (FOR ECI CONTROL) |

FIG.11B

| NODE TYPE | ENCRYPTION KEY |
|---|---|
| I/O PROCESSING NODE 31b | K2 (FOR AT CONTROL) |

FIG.11C

| NODE TYPE | ENCRYPTION KEY |
|---|---|
| I/O PROCESSING NODE 31c | K3 (FOR DBW CONTROL) |

FIG.11D

VEHICLE-CONTROL COMMUNICATION SYSTEM

FIELD OF THE INVENTION

The present invention relates to a vehicle-control communication system for dividing controls to a plurality of devices incorporated in a vehicle into a plurality of pre-specified control function units, detecting status information required for control over control function units for each of the plurality of control function units by a plurality of sensors, and controlling driving of a plurality of actuators as targets for control over the control function units according to the detected status information as well as to information from other control function units.

BACKGROUND OF THE INVENTION

A plurality of processors for control have been incorporated in a vehicle to perform various types of vehicle control by using these processors for control. For example, a processor for engine control has been used for controlling the engine to compute an amount of fuel injection corresponding to a state how the engine is running and control fuel injection to the engine according to a result of the computation. In addition, each of controls such as transmission control, brake control, and auto-drive control is also realized by using each of the corresponding processors for control respectively.

By the way, the demands for vehicle control have been becoming more and more sophisticated in recent years. It is difficult to perform the advanced vehicle control only by discretely providing each of the vehicle controls independently, because it is necessary to exchange information between processors for various controls, namely between modules for various controls and to perform integrated vehicle control according to the exchanged information. In a vehicle-mounted communication unit disclosed in Japanese Patent Laid-Open Publication No. SHO 62-237895, for instance, advanced vehicle control is realized by connecting various control modules to each other using a communication unit such as a LAN, systematizing communications for vehicle controls, and providing integrated controls for various vehicle controls.

Each of the various control modules detects a status of the vehicle using sensors, subjects corrective computation if necessary according to the detected status of the vehicle, and controls driving of an actuator as a target for control. The number of sensors and number of actuators included into the various control modules has increased due to such an advanced control. Further, the number of control modules is also increasing in order to previously realize vehicle control functions not realized so far. As a result, when various control modules are connected to each other using the above mentioned communication unit for realizing multifunctional vehicle control without any consideration of the above mentioned matter, a number of communication lines and configuration of the unit sections related to communication processing required for realization thereof increase.

In order to overcome such a problem, in the electronic control system for a vehicle disclosed in Japanese Patent Laid-Open Publication No. HEI 4-114203, for example, a main control module that integrates a plurality of control modules into one is provided, a communication line is used for connection between the plurality of control modules and the main control module, and the main control module performs centralized management and control of the plurality of control modules in such a manner as if the main control module controls the other control modules as slave devices. Thus, this electronic control system for a vehicle can integrally control the various types of vehicle control and also perform multifunctional vehicle control.

However, during the development of vehicles in recent years, there have been increased cases where specifications of sensors and actuators of a control module are partially changed or specifications of operation processing are changed. In such cases, in the conventional type of vehicle-control communication system, it is required to design a new control module again because the system is constructed by control module units. This lowers the development efficiency.

In addition, there are cases where different control modules are combined or the way the control modules are used is different depending upon the type of vehicle. In such cases also, it is required to design a new control module again for each type of vehicle, which lowers the development efficiency.

Furthermore, in association with provision of many functions to the vehicle in recent years, there has been a tendency to increase the functions provided to each control module and perform the processing at higher-speed. Further, and also there have been tendencies that advanced throughput has been demanded for each of the control modules itself and the number of control modules to be incorporated in a vehicle has increased. Due to such reasons, an amount of information to be transmitted and received between control modules has increased. However, the conventional type of communication system in which all the control modules are connected to each other by a communication unit such as a LAN can not speedily support such an increase in an amount of information for communications. Further, in the conventional type of communication system in which a main control module is used so that the main module is followed by control modules to make them execute communications between the control modules, the load on the main control module increases. Thus, neither of the systems can sufficiently support an enormous amount of information transmitted and received within a multifunctional vehicle.

A unified communication system is constructed in the conventional type of the vehicle-control communication system. Therefore, if a malfunction occurs within a control module, there is now way for the other control modules to know this malfunction and they keep on performing the control operation. In order to overcome this redundancy, the system is so designed that each of the control modules discretely monitors the status of the system on its own. However, this increases a workload on the control modules.

Various types of vehicle-control communication system are developed by giving consideration to the multi-functioning of the vehicles. However, original information used for vehicle control may be tampered with due to incorporation of an illegal communication node in a vehicle or through communications by a maliciously-intended communication node in accordance with advanced control provided for a vehicle. Further, the information for vehicle control may be tapped via those illegal communication node or a maliciously-intended communication node. It has been desired to prevent the tampering with or tapping of information before it happens. In actual cases, when vehicles having the same or similar type of vehicle-control communication system incorporated therein come closer to each other, the various elements of information on the vehicle-control communication systems interfere with each other and cause unexpected malfunctions. It is also necessary to prevent a accidents due to the malfunctions described above before they happen.

SUMMARY OF THE INVENTION

It is an object of the present invention to provide, for the purpose of solving the problems described above, a vehicle-control communication system which can flexibly and easily support further system development with a small amount of labor and time for development even under the situations of an increased number of control modules, speeding up, partial changes in specifications for the control module, and increasing the amount of information for communications between control modules in association with achievement of higher performance of a vehicle, and which also can enhance development efficiency, as well as to obtain the vehicle-control communication system which can prevent tampering with or tapping of information transmitted and received within the system before it happens.

In the present invention, a plurality of control function units such as ECI (engine control) and ABS (anti-lock brake system) are divided into a plurality of control function groups; a plurality of I/O processing units execute, within each of the plurality of control function groups, processing that is of comparatively light load and requires real-time processing by a control function unit; and an operation processing unit executes processing requiring high-speed processing within each of the plurality of control function units such as execution of a plurality of operation processing corresponding to the plurality of control function units according to the information inputted from the plurality of I/O processing units and output of each result of the operation processing to the plurality of corresponding I/O processing units respectively; then, within each control function group, a plurality of I/O processing units are connected to an operation processing unit by a first communication unit, while the plurality of control function groups are connected to each other by a second communication unit so that hierarchical communications are realized such that transmit-receive of information within each of the control function groups is performed via the first communication unit and transmit-receive of information between the control function groups is performed via the second communication unit.

In the present invention, a first communication unit connects at least two or more of control function groups to each other, and between the connected control function groups, information to be transreceived between control function groups is also transmitted and received via this first communication unit.

In the present invention, a plurality of control function units are further divided into or integrated into a plurality of I/O processing units for executing input/output processing to sensors and actuators corresponding to the plurality of control function units by the plurality of control function units as well as into a plurality of operation processing units for dividing the plurality of control function units into a plurality of control function groups, executing a plurality of operation processes corresponding to the plurality of control function nits according to the information inputted from the plurality of I/O processing units at least belonging to the plurality of divided control function groups, and outputting each result of the operation processing to the plurality of corresponding I/O processing units within the control function group; and the I/O processing units are connected to the operation processing units by one communication unit, and information between the I/O processing units and the operation processing units is transmitted and received via this communication unit.

In the present invention, a scheduler adjusts schedules for transmit-receive of information between the plurality of I/O processing units and the plurality of operation processing units to make the system execute efficient communication processing.

In the present invention, a scheduler is provided in any of the plurality of operation processing units to make any of the plurality of operation processing units execute scheduling by the scheduler.

In the present invention, each of I/O processing units and operation control units has at least normal mode to shift to a status of a normal processing operation and maintenance mode to shift to a status of system maintenance, and a scheduler monitors the status of transmission by the plurality of I/O processing units and the plurality of operation processing units, transmits an alarm message using the communication unit to the plurality of I/O processing units and the plurality of operation processing units when any abnormal condition is detected, and shifts the plurality of I/O processing units and the plurality of operation processing units from the normal mode to the maintenance mode to prevent runaway or the like of the I/O processing units and operation processing units before it happens.

In the present invention, a format of information to be transmitted and received by the first communication unit, second communication unit, and the communication unit is made common by using a standardized information format.

In the present invention, each of I/O processing units and operation processing units further comprises an identifying unit, which adds identifying information specific to the vehicle-control communication system to information to be transmitted via the first communication unit, second communication unit, and the communication unit, transmits the information, and also performs identification of received information.

In the present invention, each of I/O processing units and operation processing units further comprises an encrypting/decrypting unit, which encrypts information to be transmitted via the first communication unit, second communication unit, and the communication unit using an encryption key, and decrypts the encrypted information.

Other objects and features of this invention will become apparent from the following description with reference to the accompanying drawings.

BRIEF DESCRIPTION OF THE DRAWINGS

FIG. 5 is an example of a structure of a node construction table in Embodiment 4 of the present invention;

FIG. 6 is an example of a structure of a transmission control table in Embodiment 4 of the present invention;

FIG. 11A to FIG. 11D are examples of encryption keys used in Embodiment 7 of the present invention.

DESCRIPTION OF THE PREFERRED EMBODIMENTS

Detailed description is made hereinafter for the preferred embodiments of the vehicle-control communication system according to the present invention with reference to the attached drawings.

Figure 1:
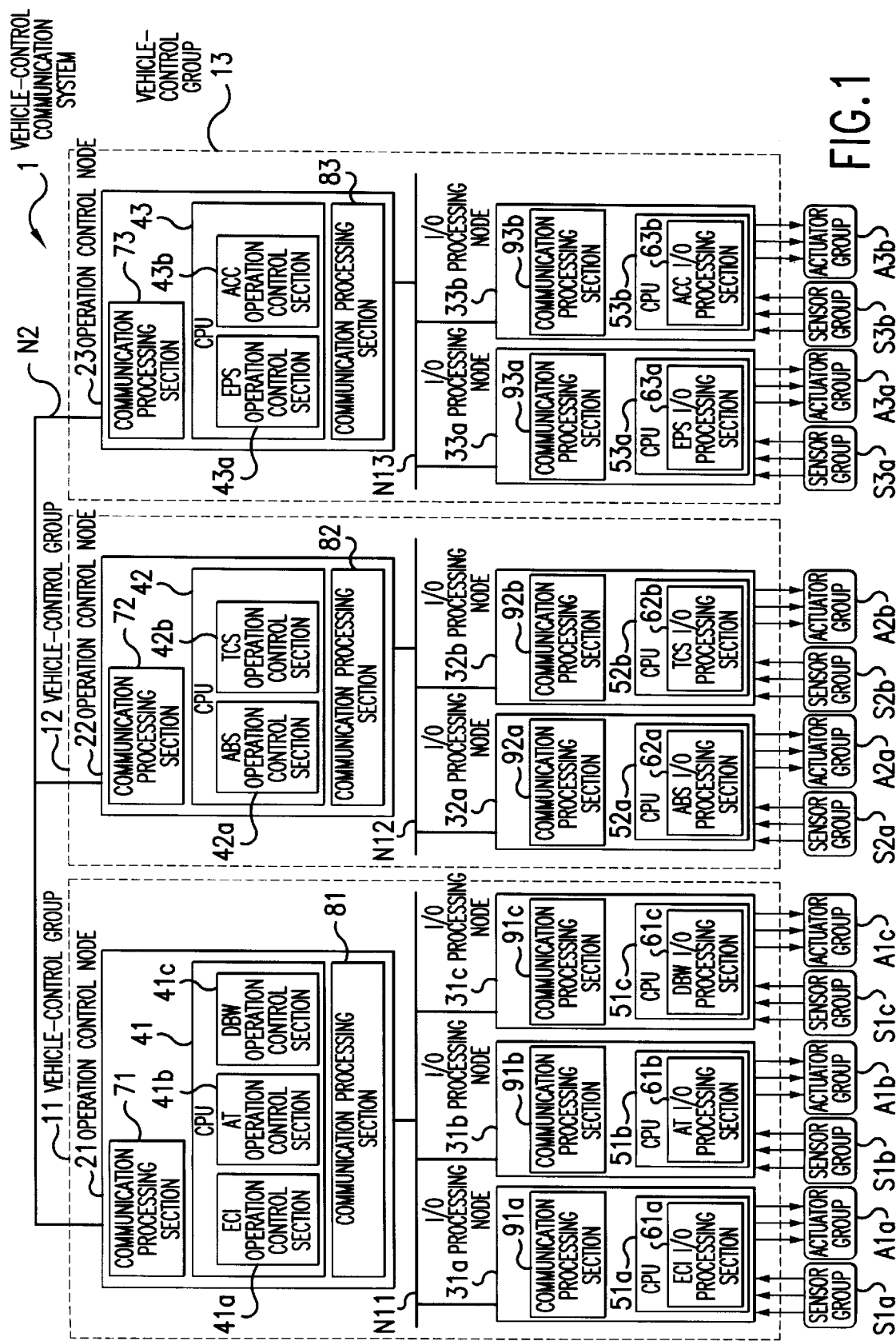
FIG. 1 is a block diagram showing configuration of a vehicle-control communication system as Embodiment 1 of the present invention.

Embodiment 1 of the present invention will be described first. FIG. 1 is a block diagram showing configuration of a vehicle-control communication system 1 according to Embodiment 1 of the present invention. The vehicle-control communication system 1 shown in FIG. 1 is incorporated in a vehicle not shown therein and provides controls for sections in the vehicle such as engine control (ECI), automatic control (AT), throttle control (DBW), an anti-lock brake system (ABS), a traction control system (TCS), power steering control (EPS), and advanced cruise control (ACC). These vehicle controls are divided into three vehicle control groups 11 to 13.

The vehicle control group 11 has three control functions of ECI function, AT function, and DBW function. The vehicle control group 12 has two control functions of ABS function and a TCS function. Finally, the vehicle control group 13 has two control functions of EPS function and ACC function. Each of the vehicle control groups 11 to 13 contain control functions which are relatively closely related to each other.

The control functions such as the operation control functions and the I/O processing functions are performed separately in each of the vehicle control groups 11 to 13. Further, control functions such as the operation control functions are integrated in a single module within each of the vehicle control groups 11 to 13. The integrated modules are realized as operation control nodes 21 to 23 each respectively corresponding to the vehicle control groups 11 to 13.

The I/O processing functions are realized as I/O processing nodes 31a to 31c, 32a and 32b, 33a and 33b formed as modules corresponding to the control functions respectively. Namely, the vehicle control group 11 has the operation control node 21 that provides operation control for the ECI function, AT function, and DBW function. Further, the vehicle control group 11 has the I/O processing node 31a for executing I/O processing required for the ECI function, the I/O processing node 31b for executing I/O processing required for the AT function, and the I/O processing node 31c for executing I/O processing required for the DBW function provided therein.

The vehicle control group 12 has the operation control node 22 for providing operation control for the ABS function and TCS function. Further, the vehicle control group 12 has the I/O processing node 32a for executing I/O processing required for the ABS function, and the I/O processing node 32b for executing I/O processing required for the TCS function. The vehicle control group 13 has the operation control node 23 for providing operation control for the EPS function and ACC function. Further, the vehicle control group 13 has the I/O processing node 33a for executing I/O processing required for the EPS function, and the I/O processing node 33b for executing I/O processing required for the ACC function provided therein.

Information exchange among the vehicle control groups 11 to 13 is performed via a communication line N2. Information is transmitted and received among the operation control node 21 and the I/O processing nodes 31a to 31c via a communication line or bus N11 within the vehicle control group 11. Information is transmitted and received among the operation control node 22 and the I/O processing nodes 32a and 32b via a communication line or bus N12 within the vehicle control group 12. Finally, information is transmitted and received among the operation control node 23 and the I/O processing nodes 33a and 33b via a communication line or bus N13 within the vehicle control group 13.

The I/O processing node 31a in the vehicle control group 11 consists of a CPU 51a as a processor having an ECI-I/O processing section 61a for executing I/O processing required for the ECI function, and a communication processing section 91a for executing communication processing with the communication line N11. The I/O processing node 31b consists of a CPU 51b as a processor having an AT-I/O processing section 61b for executing I/O processing required for the AT function, and a communication processing section 91b for executing communication processing with the communication line N11.

Furthermore, the I/O processing node 31c consists of a CPU 51c as a processor having a DBW-I/O processing section 61c for executing I/O processing required for the DBW function, and a communication processing section 91c for executing communication processing with the communication line N11. The operation control node 21 in the vehicle control group 11 consists of a CPU 41 as a single processor having an ECI operation control section 41a for providing controls required for an operation of the ECI function, an AT operation control section 41b for providing controls required for an operation of the AT function, and a DBW operation control section 41c for providing controls required for an operation of the DBW function. Further, the operation control node 21 in the vehicle control group 11 consists of a communication processing section 81 for executing communication processing via the communication line N11, and a communication processing section 71 for executing communication processing via the communication line N2.

Similarly, the two I/O processing nodes 32a, 32b in the vehicle control group 12 consist of CPUs 52a, 52b as processors having an ABS-I/O processing section 62a, a TCS-I/O processing section 62b, communication processing sections 92a, 92b for executing communication processing via the communication line N12. The operation control node 22 consists of a CPU 42 as a single processor having an ABS operation control section 42a, a TCS operation control section 42b. Further, the operation control node 22 consists of a communication processing section 82 for executing communication processing via the communication line N12 and a communication processing section 72 for executing communication processing via the communication line N2.

Furthermore, the two I/O processing nodes 33a, 33b in the vehicle control group 13 consist of CPUs 53a, 53b as processors having an EPS-I/O processing section 63a, an ACC-I/O processing section 63b, communication processing sections 93a, 93b for executing communication processing via the communication line N13. The operation control node 23 consists of a CPU 43 as a single processor having an EPS operation control section 43a, an ACC operation control section 43b. Further, the operation control node 23 consists of a communication processing section 83 for executing communication processing via the communication line N13 and a communication processing section 73 for executing communication processing via the communication line N2.

When the sensor information for the ECI function from a sensor group S1a is received by the I/O processing node 31a of the vehicle control group 11, the CPU 51a converts the sensor information to a prespecified information format. For example, when a value detected by the sensor group S1a is an analog voltage value, the CPU 51a converts this value to obtain a digital value. The converted sensor information is converted to a prespecified communication format by the communication processing section 91a and transmitted to the operation control node 21 via the communication line N11.

Similarly, when the sensor information for the AT function from a sensor group S1b is received by the I/O processing node 31b, the CPU 51b converts the sensor information to a prespecified information format. Then, the converted sensor information is converted to a prespecified communication format by the communication processing section 91 bandwidth transmitted to the operation control node 21 via the communication line N11. When the sensor information for the DBW function from a sensor group S1c is received by the I/O processing node 31c, the CPU 51c converts the sensor information to a prespecified information format. Then, the converted sensor information is converted to a prespecified communication format by the communication processing section 91c and transmitted to the operation control node 21 via the communication line N11.

The operation control node 21 obtains the sensor information on the communication line N11 via the communication processing section 81. When the obtained sensor information is information for the ECI function sent from the I/O processing node 31a, the CPU 41 makes the ECI operation control section 41a execute operation processing for ECI control. For example, the ECI operation control section 41a generates control information to drive an actuator group A1a related to ECI according to the sensor information for ECI and also executes operation processing to data such as correction data if necessary.

Similarly, when the obtained sensor information is information for the AT function sent from the I/O processing node 31b, the CPU 41 makes the AT operation control section 41b execute operation processing for AT control. Also, when the obtained sensor information is information for the DBW function sent from the I/O processing node 31c, the CPU 41 makes the DBW operation control section 41c execute operation processing for DBW control.

When it is necessary to obtain information required for the ECI operation processing, AT operation processing, or DBW operation processing from the other operation control nodes 22 or 23, then the CPU 41 accesses the corresponding operation control nodes 22, 23 via the communication processing section 71 and communication line N2 and acquires the necessary information. The necessary information may be the sensor information itself or may be a result of operation processed by the CPUs 42, 43. When accessed in order to acquire information by the other operation control nodes 22 or 23, the CPU 41 transmits corresponding information to the operation control nodes 22 or 23 that made the access. The CPU 41 may also voluntarily transmit the information to the other operation control nodes 22 and 23.

The CPU 41 transmits corresponding control information as a result of operation processing to each of the I/O processing nodes 31a to 31c via the communication processing section 81 and communication line N11. Each of the I/O processing nodes 31a to 31c receives the corresponding control information via each of the communication processing sections 91a to 91c, and the CPUs 51a to 51c output the control information to the actuator groups A1a to A1c respectively as actuator information. For example, the CPU 51a converts the digital control information for ECI to an analog voltage value and outputs the converted value to the corresponding actuator group A1a as actuator information.

Similarly, within the vehicle control group 12, the operation control node 22 and the I/O processing nodes 32a, 32b are connected to each other by the communication line N12, and are connected to the other operation control nodes 21, 23 via the communication line N2. The I/O processing nodes 32a, 32b have CPUs 52a, 52b as processors respectively, and the operation control node 22 has a CPU 42 as a single processor.

The CPU 42 has, the ABS operation control section 42a for providing controls for an operation of the ABS function and TCS operation control section 42b for providing controls for an operation of the TCS function, and process operation control for the ABS function and TCS function within the single processor in order to generate actuator information for controlling driving of actuator groups A2a, A2b according to sensor information obtained from sensor groups S2a, S2b. On the other hand, the CPUs 52a, 52b of the I/O processing nodes 32a, 32b receive and convert sensor information from the sensor groups S2a, S2b to a prespecified information format, output the converted information to the operation control node 22 via the communication line N12, and also convert control information received via communication line N12 to prespecified actuator information and output the converted information to the actuator groups A2a and A2b respectively.

Similarly, within the vehicle control group 13, the operation control node 23 and the I/O processing nodes 33a, 33b are connected to each other by the communication line N13, and are connected to the other operation control nodes 21, 22 via the communication line N2. The I/O processing nodes 33a, 33b have CPUs 53a, 53b as processors respectively, and the operation control node 23 has a CPU 43 as a single processor.

The CPU 43 has, the EPS operation control section 43a for providing controls for an operation of the EPS function and ACC operation control section 43b for providing controls for an operation of the ACC function, and process operation control for the EPS function and ACC function within the single processor in order to generate actuator information for controlling driving of actuator groups A3a, A3b according to sensor information obtained from sensor groups S3a, S3b. On the other hand, the CPUs 53a, 53b of the I/O processing nodes 33a, 33b receive and convert sensor information from the sensor groups S3a, S3b to a prespecified information format, output the converted information to the operation control node 23 via the communication line N13, and also convert control information received via communication line N13 to prespecified actuator information and output the converted information to the actuator groups A3a and A3b respectively.

As described above, in Embodiment 1, functions for vehicle control consisting of the ECI function, AT function, DBW function, ABS function, TCS function, EPS function, and ACC function are divided into the operation control nodes 21 to 23 each having an operation control function and the I/O processing nodes 31a to 31c, 32a, 32b, 33a, and 33b each having an I/O processing function, and then the vehicle control functions are divided into three vehicle control groups 11 to 13 each having a close relation therein such as a group of the ECI function, ACC function, and DBW function, a group of the ABS function and TCS function, and a group of the EPS function and ACC function. Further, each of the operation control nodes 21 to 23 in these divided vehicle control groups 11 to 13 executes operation control processing included in the vehicle control group 11 to 13 by using the single processors 41 to 43 respectively. Further, within the vehicle control groups 11 to 13, information is received and transmitted on a network including the communication lines N11 to N13 connecting the operation control nodes 21 to 23 to the I/O processing nodes 31a to 31c, 32a and 32b, 33a and 33b respectively. On the other and, each of the vehicle control groups 11 to 13 executes communication processing with the other two among the vehicle control groups 11 to 13 by transmitting and receiving information on a communication network including the communication line or bus N2 connecting the vehicle control groups 11 to 13 to each other.

Generally, the I/O processing consisting of input processing from the sensor groups S1a to S1c, S2a, S2b, S3a, and S3, bandwidth output processing to the actuator groups A1a to A1c, A2a, A2b, A3a, and A3b is simple and light. Therefore a low-speed processor can be used and also the processing is affected by the sensor group and actuator group each connected to the processor, because of that, configuration of an I/O processing node by each vehicle control function allows development efficiency to significantly be enhanced. As for the operation control processing, on the other hand, although there are many cases where the load on processing such as a correction data operation is heavy, provision of operation control by using a single high-speed processor by the divided vehicle control group results in integration of development environment, which makes it possible to enhance the development efficiency in return.

Furthermore, in general, an amount of information to be transmitted and received within each of the vehicle control groups is large, therefore a communications network including one of the communication lines N11 to N13 is formed in each of the vehicle control groups and communications are executed within the vehicle control group. As a result, transmission and reception transmit-receive of information only between the nodes in each of the vehicle control groups may be performed, so that, in addition to efficient processing in the operation control node and I/O processing nodes, real-time vehicle control can easily be realized by making the network to a high-speed communications network. On the other hand, a vehicle control group is connected to the other vehicle control groups by a communications network including the communication line N2, therefore multifunctional vehicle control can be realized, and as information to be transmitted and received especially between the vehicle control groups is a small amount, so that a low-speed network with its use bandwidth suppressed to be low can be used.

Namely, each of the CPUs 41 to 43 is formed with a high-speed processor, each of the CPUs 51a to 51c, 52a, 52b, 53a, and 53b is formed with a low-speed processor, a communications network including communication lines N11 to N13 is formed with a high-speed network, and a communications network including the communication line N2 can be formed with a low-speed network. With such a structure, multifunctional vehicle control can be executed in real time, besides, by forming a divided module of the operation control node and I/O processing nodes, development efficiency can also significantly be enhanced.

Embodiment 2 of the present invention will be described here. The above mentioned Embodiment 1 has been configured so as to transmit and receive information within each of the vehicle control groups 11 to 13 via the communication line N11 to N13 respectively and to transmit and receive information between the vehicle control groups 11 to 13 via the communication line N2. On the contrary, Embodiment 2 explained below is configured so as to make a connection for communication between the vehicle control groups 11 and 12 which are closely related to each other and there is a large amount of information to be transmitted and received therebetween by one communication line N21 instead of the two communication lines N11 and N12.

Figure 2:
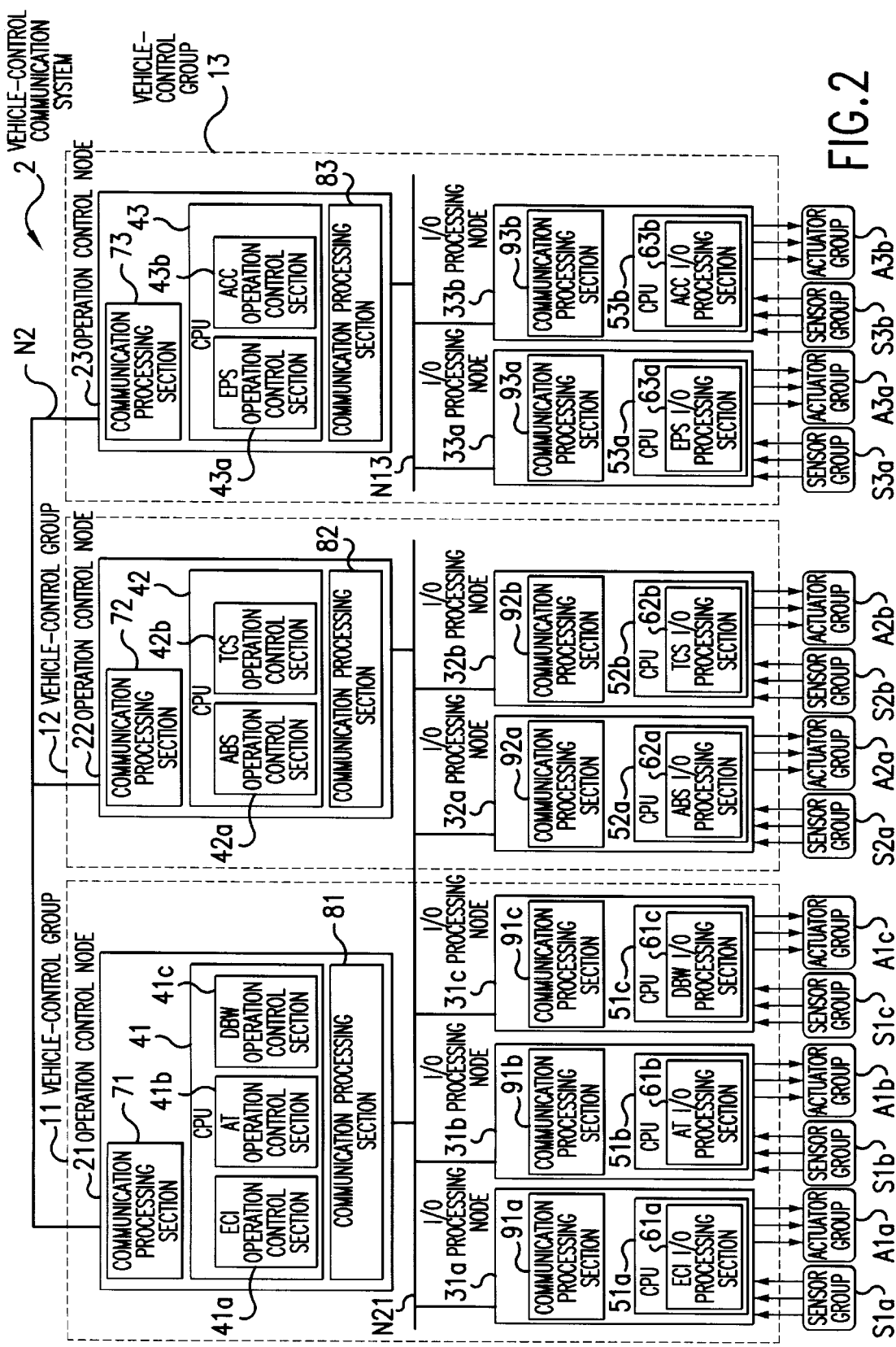
FIG. 2 is a block diagram showing configuration of a vehicle-control communication system as Embodiment 2 of the present invention.

FIG. 2 is a block diagram showing configuration of a vehicle-control communication system 2 according to Embodiment 2 of the present invention. As shown in FIG. 2, operation control nodes 21, 22 and I/O processing nodes 31a to 31c, 32a, and 32b are connected to each other via the communication line N21. The configuration of the other sections in the figure is the same as that in Embodiment 1, and the same reference numerals are assigned to the sections corresponding to those in Embodiment 1.

This case may be considered as the one in which the operation control node 21 and the operation control node 22 are into a single operation control node, but in that case, the configuration is the same as that in Embodiment 1. In Embodiment 2, it is necessary to maintain the vehicle control groups 11 to 13 shown in Embodiment 1 as far as development efficiency is concerned, but the case where a large amount of information is transmitted and received between the vehicle control groups 11 and 12 may interfere with the real-time processing, and because of that, high-speed communications are realized via the communication line N21 for solution of the problem.

Communications are hardly executed between the I/O processing nodes 31a to 31c and the operation control node 22 via the communication line N21 or between the I/O processing nodes 32a, 32b and with the operation control node 21 via the communication line or bus N21. However, communications between the operation control nodes 21 and 22 are made by using the communication line or bus N21, and information such as a result of operations in the operation control nodes 21, 22 is transmitted and received.

The operation control nodes 21, 22 are connected for communication to the other one of the operation control nodes 21 to 23 via the communication line N2, the operation control nodes 21, 22 are also connected via the communication line N21. In this case, communication between the operation control nodes 21 and 23 and between the operation control nodes 22 and 23 is performed using the communication line N2, while communication between the operation control nodes 21 and 22 is performed via the communication line N21.

In Embodiment 2, it is possible to provide vehicle control in real time even when there is a large amount of information to be transmitted and received among the vehicle control groups 11 to 13 and besides there is a comparatively large amount of information to be transmitted and received between any two of the vehicle control groups.

Embodiment 3 of the present invention will be described here. Communication is executed among the vehicle control groups 11 to 13 connected to each other using the communication line N2 in both Embodiments 1 and 2. However, in Embodiment 3, the operation control nodes 21 to 23 and the I/O processing nodes 31a to 31c, 32a, 32b, 33a, and 33b are logically connected to each other using only a single communication line N31 without provision of the communication line N2.

Figure 3:
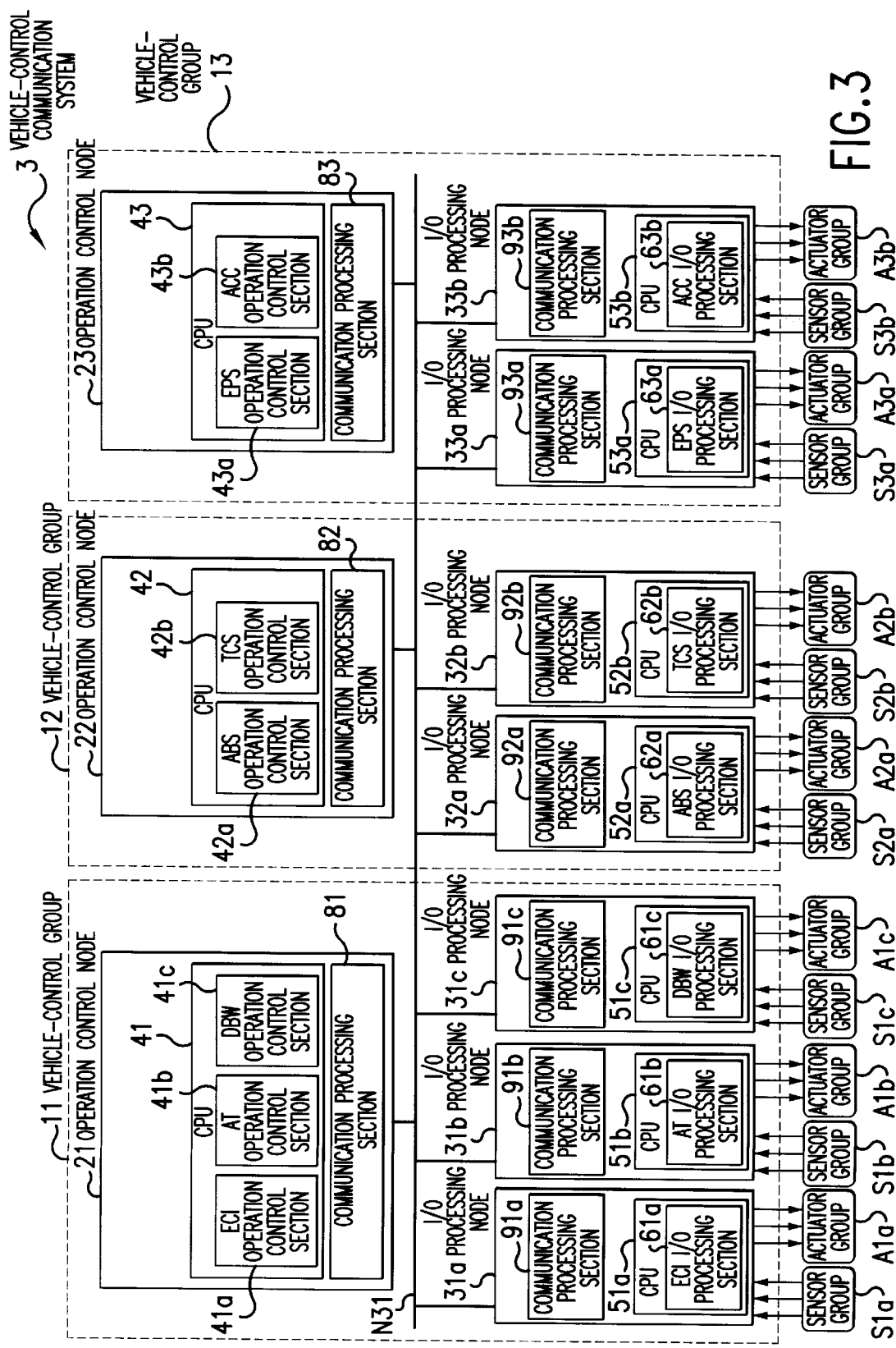
FIG. 3 is a block diagram showing configuration of a vehicle-control communication system as Embodiment 3 of the present invention.

FIG. 3 is a block diagram showing configuration of a vehicle-control communication system 3 according to Embodiment 3 of the present invention. As shown in FIG. 3, the communication line N31 is formed by integrating the communication lines N11 to N13 in Embodiment 1 in a single communication line. The operation control nodes 21 to 23 and the I/O processing nodes 31a to 31c, 32a, 32b, 33a, and 33b are logically connected to this communication line N31. Herein, "logically" means to allocate an address to each of the nodes on the communication network.

Thus, the information to be transmitted and received on the communication line N31 is the same as the information to be transmitted and received on the communication lines N11 to N13 as well as on the communication line N2 in Embodiment 1. In this case also, the vehicle control groups 11 to 13 are divided into the operation control nodes 21 to 23 and the I/O processing nodes 31a to 31c, 32a, 32b, 33a, and 33b in the same manner as in Embodiments 1 and 2. Therefore, by speeding up the communication line including the communication line N31, vehicle control can be provided in real time even for a multifunctional vehicle.

In Embodiment 3, only a single communication line N31 is provided therein, and it is not necessary to provide a communication line N2 used for connection between the vehicle control groups 11 to 13 and to provide communication processing sections 71 to 73 for using the communication line N2. Thus, the configuration is made simple, which allows a number of harnesses to be reduced. In addition, Embodiment 3 has node configuration comprising the operation control nodes 21 to 23 and the I/O processing nodes 31a to 31c, 32a, 32b, 33a, and 33b similarly to that in Embodiments 1 and 2, so that even when design is to be changed such as addition of a new node, flexible node arrangement is possible only by connecting the new node to the communication line N31, which allows development efficiency to be enhanced.

Embodiment 4 of the present invention will be described here. In Embodiment 3 described above, the same communication processing has been executed to all the nodes 21 to 23, 31a to 31c, 32a, 32b, 33a, and 33b. However, in Embodiment 4, a scheduler function for integrally controlling the use of the communication line N31 is newly provided therein.

Figure 4:
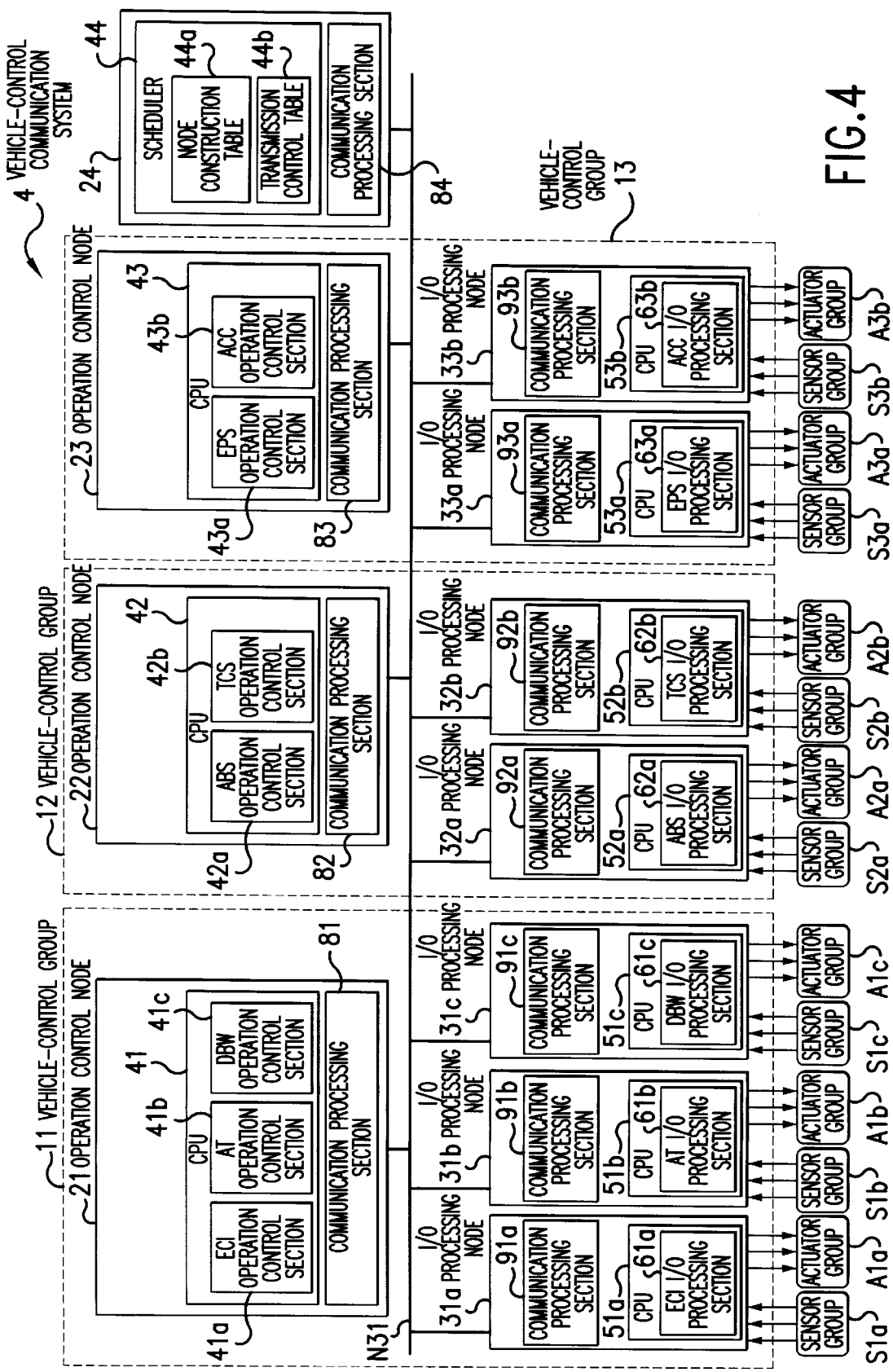
FIG. 4 is a block diagram showing configuration of a vehicle-control communication system as Embodiment 4 of the present invention.

FIG. 4 is a block diagram showing configuration of a vehicle-control communication system 4 according to Embodiment 4 of the present invention. As shown in FIG. 4, operation control nodes 21 to 23 and I/O processing nodes 31a to 31c, 32a, 32b, 33a, and 33 bandwidth a scheduler node 24 for adjusting schedules of those nodes are logically connected to a communication line N31.

The scheduler node 24 has a scheduler 44 and a communication processing section 84. The communication processing section 84 accepts requests to transmit received from the nodes 21 to 23, 31a to 31c, 32a, 32b, 33a, and 33b via the communication line N31, manages the requests by referring to a node construction table 44a and a transmission control table 44b each provided in the scheduler 44, and transmits transmission control information to any of the nodes 21 to 23, 31a to 31c, 32a, 32b, 33a, and 33b which makes the request to transmit thereto via the communication line N31.

FIG. 5 is a view showing an example of a structure of the node construction table 44a in the scheduler 44, and FIG. 6 is a view showing an example of a structure of the transmission control table 44b in the scheduler 44. As shown in FIG. 5, priority and required bandwidth for each of the operation control nodes 21 to 23 and the I/O processing nodes 31a to 31c, 32a, 32b, 33a, and 33b which are all nodes connected to the communication line N31 are registered in the node construction table 44a. Three types of node priority are provided, and priorities for transmission are set in the nodes in order of "High" to "Middle" to "Low". The bandwidth required for a node is a bandwidth for using the communication line N31 and is set in consideration of an amount of information to be transmitted and received between nodes and an operation speed.

Herein, a bandwidth to be used is defined in a the order of msec to provide time-division control. For example, a required bandwidth for the I/O processing nodes 31a, 31b is set to 10 msec, a required bandwidth for the I/O processing nodes 31c, 32a, 32b is set to 20 msec, and a required bandwidth for the I/O processing nodes 33a, 33b is set to 30 msec. The required bandwidth for each of the operation control nodes 21 to 23 is zero. This is due to the fact that, there is generally no request to transmit from the operation control nodes 21 to 23 and a request to transmit is made when transmission and reception of data are required between the operation control nodes 21 to 23. Namely, a request to transmit from any of the I/O processing nodes 31a to 31c, 32a, 32b, 33a, and 33b indicates that the I/O processing node will perform transmit-receive of information with any of the operation control nodes 21 to 23 corresponding to the I/O processing node, and a bandwidth required for the transmit-receive of information is defined as a required bandwidth.

On the other hand, the transmission control table 44b shown in FIG. 6 is generated according to the priorities and required bandwidthes of nodes set in the node construction table 44a, and a transmission cycle allocated to each node from its required bandwidth, a transmission history, and a node status for each node are updated and stored therein. The scheduler 44 provides controls for transmission timing corresponding to each node. "Transmission history" indicates that, when a plurality of requests to transmit are retained in a reception buffer not shown herein as a queue, the processing status of the queue is stored therein as a history.

In the example of "Transmission history" shown in FIG. 6, the I/O processing node 31c is shown as "being transmitted", which indicates that transmission processing by the I/O processing node 31c is currently been executed. On the other hand, the I/O processing nodes 32a, 32b, 33a, and 33b are shown as "not yet transmitted", which indicates that the I/O processing nodes are in a standby status for transmission. The I/O processing nodes in a standby status for transmission are transmitted in order of priority. "Node status" indicates that whether each node is normally operating or not is monitored and a result of monitoring is updated and stored therein. As described later, when a certain node shows its status as "abnormal", the scheduler 44 transmits an alarm message to each of the nodes.

Figure 7:
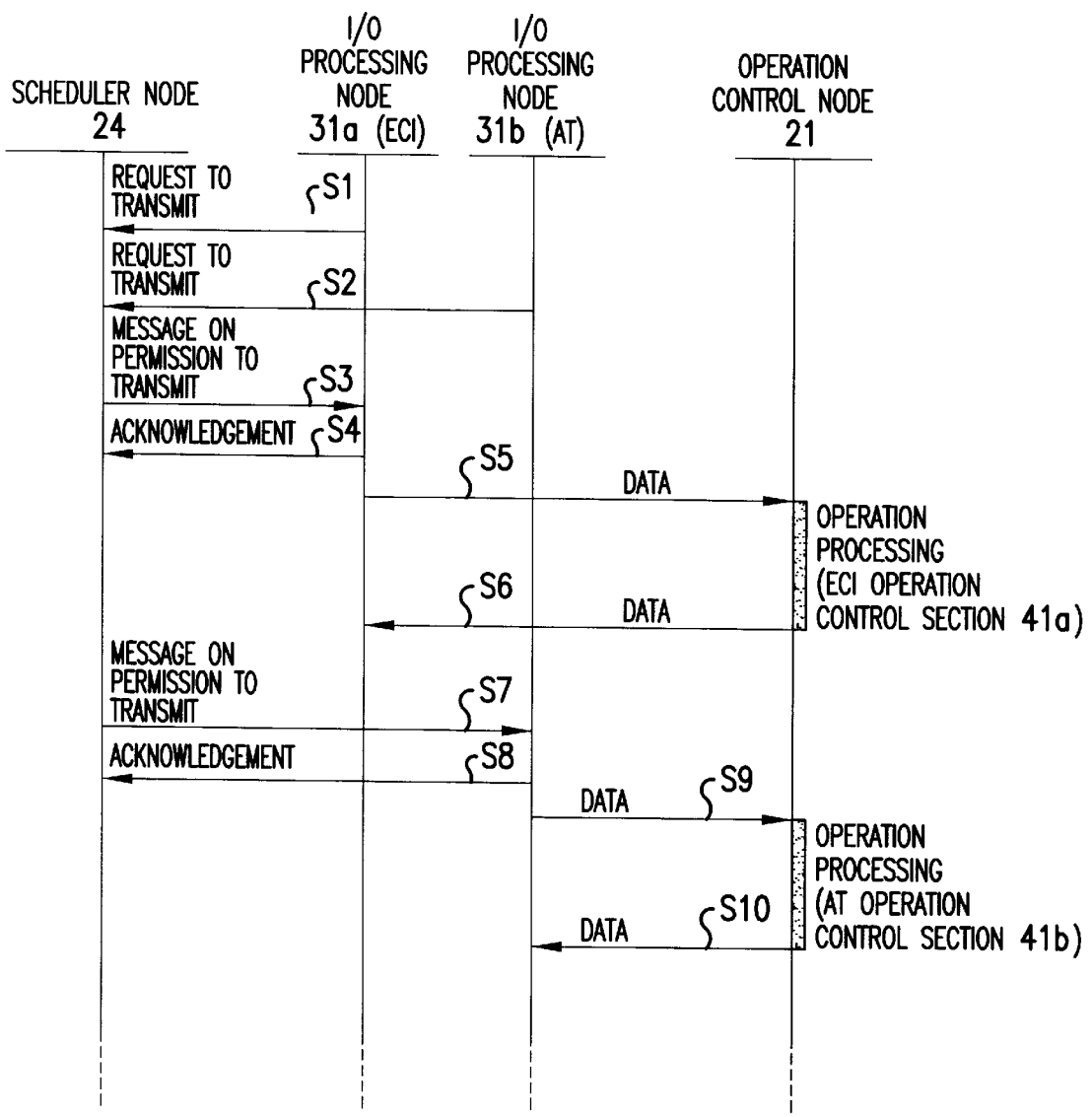
FIG. 7 is a sequence diagram showing an example of a sequence of transmit-receive processing by a scheduler in Embodiment 4 of the present invention.

Next description is made for an example of transmission control by the scheduler 44 with reference to FIG. 7. FIG. 7 is a diagram showing an example of a sequence of transmission control by the scheduler 44, and shows an example when a request to transmit is made from the I/O processing nodes 31a and 31c.

In FIG. 7, at first, when requests to transmit are successively made from the I/O processing nodes 31a and 31b to the scheduler 44 (S1, S2), the scheduler 44 changes the transmission history in the transmission control table 44b to a not-yet-transmitted status, and then, transmits a message on permission to transmit to the high-priority I/O processing node 31a (S3). The I/O processing node 31a having received the message to that effect transmits acknowledgement indicating reception of the message to that effect to the scheduler 44 (S4), and then, transmits data for detected information to the operation control node 21 for performing the ECI control processing (S5). The operation control node 21 having received the data for detected information executes operation processing by the ECI operation control section 41a, and transmits data for a result of operation to the I/O processing node 31a (S6).

Then the scheduler 44 of the scheduler node 24 transmits a message on permission to transmit to the I/O processing node 31b (S7), and the I/O processing node 31b having received the message transmits acknowledgement indicating reception of the message to the scheduler node 24 (S8). Further, the I/O processing node 31b transmits data for detected information to the operation control node 21 for performing the AT control processing (S9). On the other hand, the operation control node 21 having received the data for detected information executes operation processing by the AT operation control section 41bandwidth transmits data for a result of operation to the I/O processing node 31b (S10).

Data transmission and reception by the I/O processing nodes 31a, 31b are executed within the above mentioned transmission cycle 10 msec. In this case, although it is programmed that the scheduler node 24 transmits a message on permission to transmit to the I/O processing node 31b in response to completion of the transmission cycle of the I/O processing node 31a, it may be programmed that each of the I/O processing nodes 31a, 31b transmits discretely a message on completion of transmission to the scheduler node 24, and the scheduler node 24 receives the message and transmits a message on permission to transmit to the next I/O processing node.

Data transmission and reception between the operation control nodes 21 to 23 are executed by a request to transmit from the operation control nodes 21 to 23 as described above. In this case, the scheduler node 24 also transmits a message on permission to transmit to any of the operation control nodes 21 to 23 that makes a request to transmit, and the operation control node having received the message transmits acknowledgement indicating reception of the message to the scheduler node 24, and then data transmission and reception are executed between the operation control nodes.

Under control of transmission management by the scheduler 44 as described above, any trouble such as a collision when there are a plurality of requests to transmit from the nodes can be eliminated, transmit-receive of information can systematically be controlled, which allows the efficient use of the communication line N31 to significantly be enhanced. This can realize real-time control even when control is provided for any multifunctional vehicle.

The scheduler 44 monitors the status of each node according to information passing on the communication line N31 and updates and stores therein a result of monitoring as "node status" in the transmission control table 44b. For example, there comes up a case where a certain I/O processing node transmits acknowledgement indicating reception of a message on permission to transmit and data is not transmitted thereafter, or a case where data is transmitted from an I/O processing node other than the I/O processing node that has transmitted the message on permission to transmit, the scheduler 44 sets the node status of the corresponding I/O processing node to "abnormal", and broadcasts an alarm message to all the operation control nodes and I/O processing nodes connected to the communication line N31.

While each of the operation control nodes and I/O processing nodes has normal operation mode for performing a normal operation for vehicle control and maintenance mode for controlling the node to shift to a predetermined safety status when any abnormal condition occurs, and all the operation control nodes and I/O processing nodes having received the alarm message forcefully shifted from the normal operation mode to the maintenance mode.

The scheduler 44 monitors the status of operation control nodes and I/O processing nodes by monitoring information on the communication line N31, and broadcasts an alarm message to all the nodes when any abnormal condition occurs to make the nodes shift from the normal operation mode to the maintenance mode, so that a control function of the vehicle-control communication system can be maintained in safety. Consequently, any vehicle accident due to some trouble of the vehicle-control communication system can be prevented before it happens.

By the way, a format of data transmitted and received on the communication line N31 can be set, for instance, by each of the vehicle control groups 11 to 13. However, it is preferable to integrate formats of data transmitted and received by the operation control nodes and I/O processing nodes into a standardized data format and use it as far as communications are executed on the identical communication line N31.

By previously integrating formats to the standardized format described above, the design can easily be changed even when an operation control node, especially an I/O processing node has to be added or changed, which makes it easy to support for flexible construction of a vehicle-control communication system.

Embodiment 5 of the present invention will be described here. In Embodiment 4 described above the scheduler 44 is connected to the communication line N31 as the scheduler node 24. On the contrary, in Embodiment 5, the scheduler 44 is incorporated in an operation control node with a CPU capable of high-speed processing.

Figure 8:
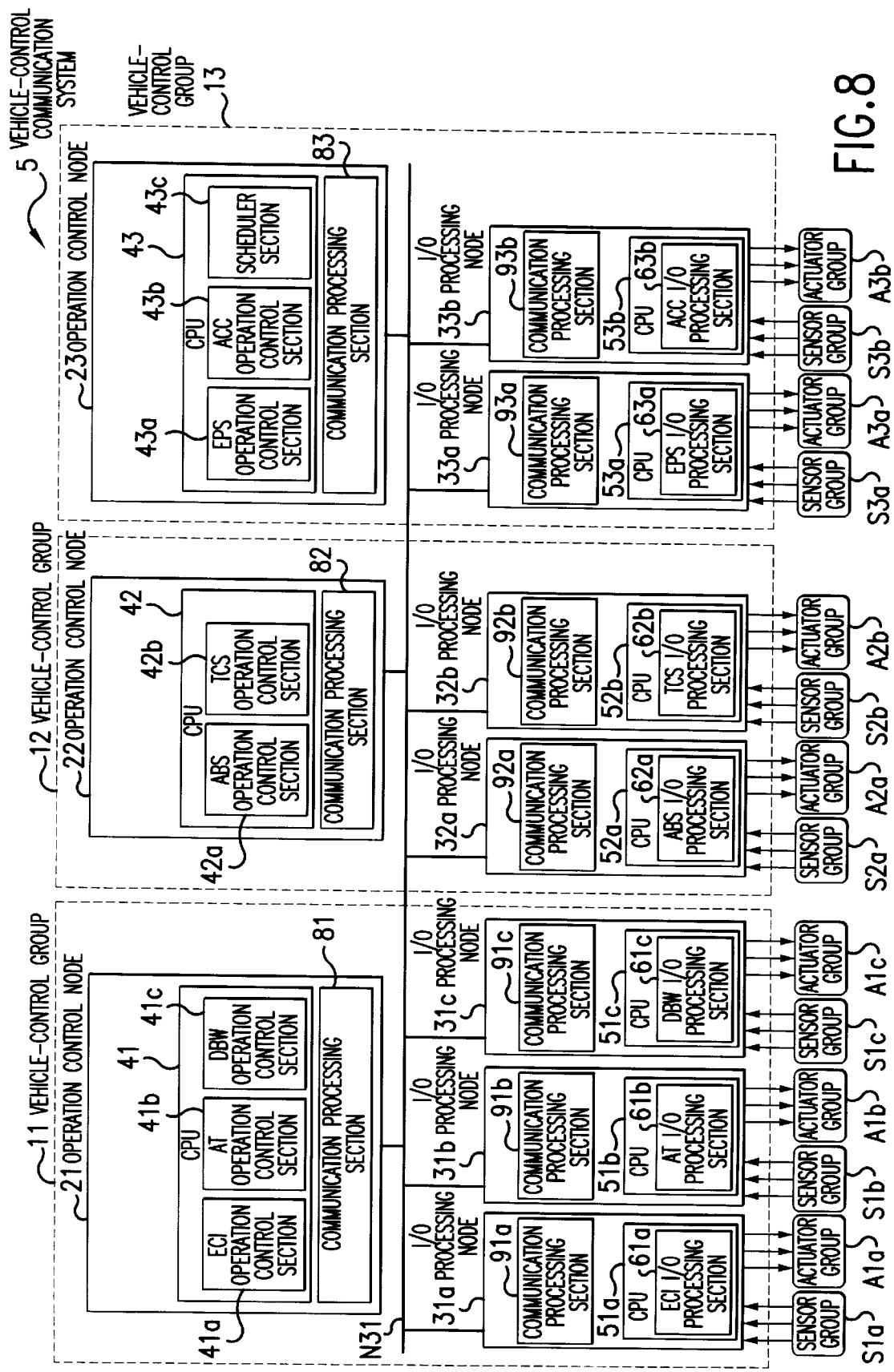
FIG. 8 is a block diagram showing configuration of a vehicle-control communication system as Embodiment 5 of the present invention.

FIG. 8 is a block diagram showing configuration of a vehicle-control communication system 5 according to Embodiment 5 of the present invention. As shown in FIG. 8, the CPU 43 in the operation control node 23 has a scheduler section 43c having the same configuration as that of the scheduler 44 in Embodiment 4. The rest of the configuration of this system is the same as the system in Embodiment 4 without the scheduler node 24. The configuration of the other sections is the same as that in Embodiment 4, and the same reference numerals are assigned to the sections corresponding to those in Embodiment 4.

The CPU with the scheduler section 43c to be provided therein is preferably included in a CPU of any operation control node having a CPU with sufficiently high processing capability because the load on the CPU increases due to addition of the scheduler section 43c thereto.

With Embodiment 5, it is not necessary to provide the special scheduler node 24 to be connected to the communication line N31 as shown in Embodiment 4, so that a number of harnesses or the like can be reduced and also the need for a communication processing section 84 with which the scheduler node 24 performs communication processing to the communication line N31 can be eliminated, which makes simpler the system configuration itself.

Embodiment 6 of the present invention will be described here. In Embodiment 3 described above, when transmit-receive of information is performed via the communication line N31, each of the nodes at least adds an address of a target node for transmission to information and transmits the information thereto, and the target node for transmission executes reception processing when the received address is coincident with the address of the node. However, in Embodiment 6 described below, in addition to the configuration, the communication processing section of each node has an identifying section for adding identifying information specific to nodes, namely specific to a vehicle-control communication system to information and transmitting the information and identifying the information with the specific identifying information added thereto further provided therein.

Figure 9:
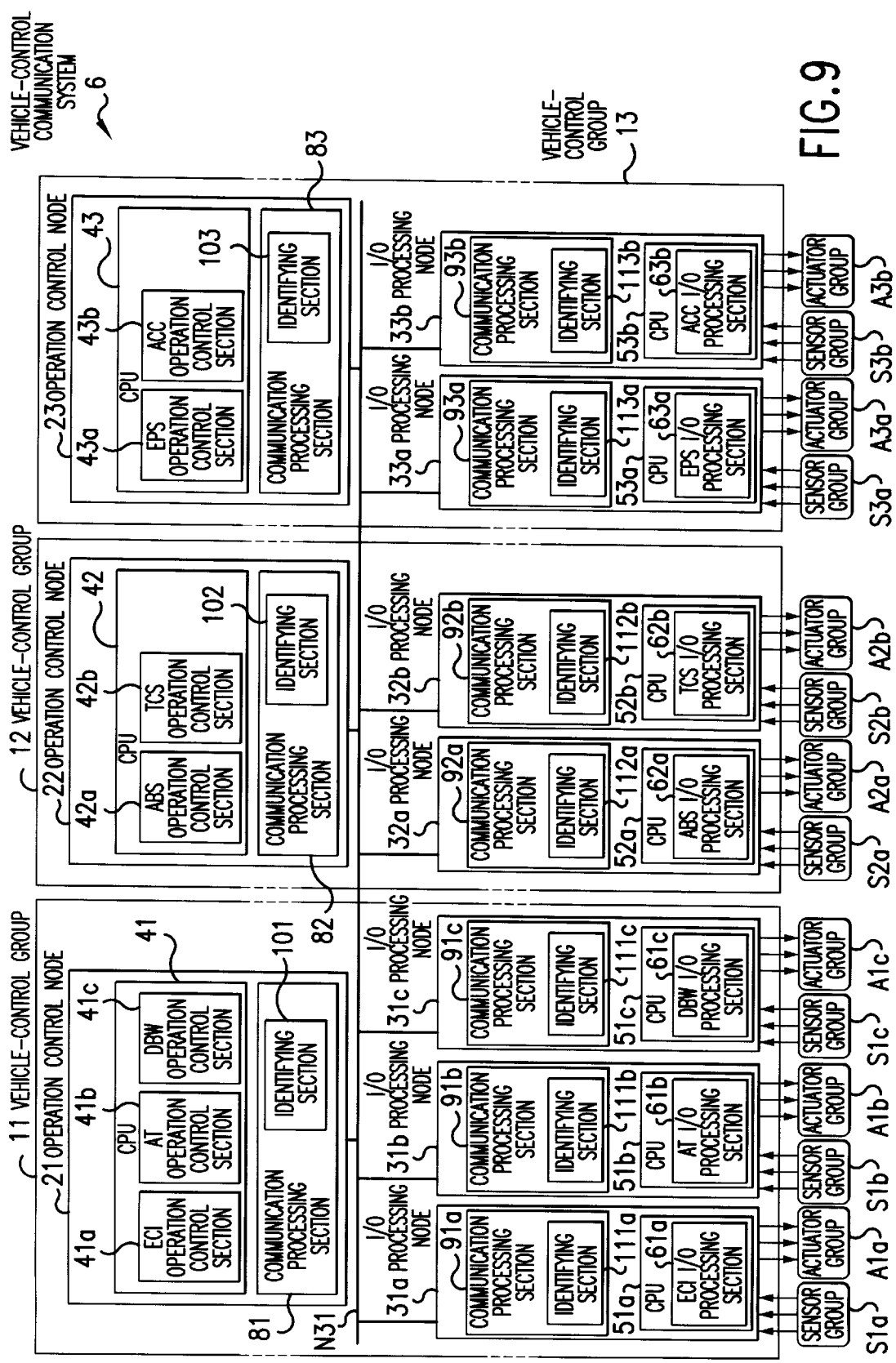
FIG. 9 is a block diagram showing configuration of a vehicle-control communication system as Embodiment 6 of the present invention.

FIG. 9 is a block diagram showing configuration of a vehicle-control communication system 6 according to Embodiment 6 of the present invention. In FIG. 9, the communication processing sections 81 to 83, 91a to 91c, 92a, 92b, 93a, and 93b of the operation control nodes 21 to 23 as well as of the I/O processing nodes 31a to 31c, 32a, 32b, 33a, and 33b have identifying sections 101 to 103, 111a to 111c, 112a, 112b, 113a, and 113b respectively.

The configuration of the other sections is the same as that in Embodiment 3, and the same reference numerals are assigned to the sections corresponding to those in Embodiment 3. Those identifying sections add identifying information specific to a vehicle-control communication system 6 to information and execute processing for identifying the specific identifying information from the received information. Therefore, only by making the specific identifying information different, even if there is another vehicle-control communication system having the same configuration as that of the vehicle-control communication system 6 as far as that of the address arrangement thereof, the vehicle-control communication systems can easily be identified from each other, thus interference between the systems and tampering with information in another vehicle-control communication system being prevented.

With Embodiment 6, a real situation such that vehicles with vehicle-control communication systems with the same or the similar type of configuration as each other on production lines incorporated therein are shipped, but even when the vehicles each incorporating therein the vehicle-control communication system with the same or the same type of configuration are located closed to each other, transmit-receive of information is executed by using identifying information specific to each vehicle, so that interference between the systems will never occur and any vehicle accident or the like encountered due to tampering with information can be prevented before it happens. In addition, tampering with an operation control node and an I/O processing node executed by a user having ill will can be prevented.

The identifying section in this embodiment may be provided in each of the communication processing sections in the other Embodiments 1, 2, 4, and 5 in the similar manner as described above so that tampering with information or the like due to interference between vehicle-control communication systems can be prevented before it happens.

Furthermore, it is needless to say that the identifying section is not necessarily provided inside the communication processing section and may be provided inside the node.

Embodiment 7 of the present invention will be described here. In Embodiment 6 described above, there is provided an identifying section for allocating a specific identifying information to each vehicle-control communication system, adding this specific identifying information to information, and identifying the specific identifying information. On the contrary, in Embodiment 7 described below, information to be transmitted and received via the communication line N31 is encrypted by allocating an encryption key specific to each node thereto.

Figure 10:
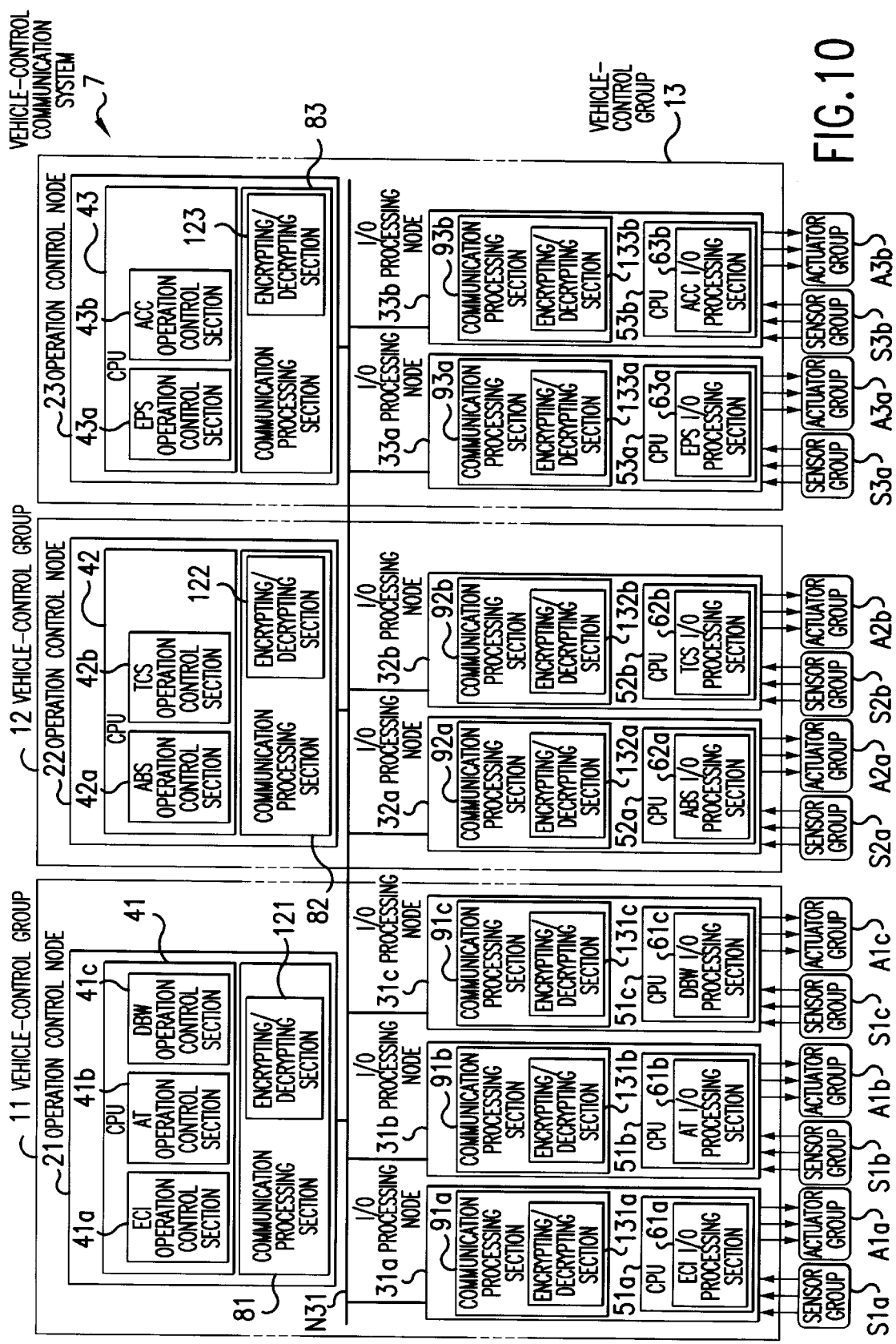
FIG. 10 is a block diagram showing configuration of a vehicle-control communication system as Embodiment 7 of the present invention.

FIG. 10 is a block diagram showing configuration of a vehicle-control communication system 7 according to Embodiment 7 of the present invention. In FIG. 10, the communication processing sections 81 to 83., 91a to 91c, 92a, 92b, 93a, and 93b of the operation control nodes 21 to 23 as well as of the I/O processing nodes 31a to 31c, 32a, 32b, 33a, and 33b have encrypting/decrypting sections 121 to 123, 131a to 131c, 132a, 132b, 133a, and 133b respectively. The configuration of the other sections is the same as that in Embodiment 3, and the same reference numerals are assigned to the sections corresponding to those in Embodiment 3. Each of those encrypting/decrypting sections has the same encryption key for each control function.

As shown in FIG. 11A, for example, the encrypting/decrypting section 121 in the communication processing section 81 of the operation control node 21 has three encryption keys K1 to K3 as targets for operation control provided by a CPU 41. The encryption keys K1 to K3 are provided for ECI control, AT control, and DBW control respectively. Further, as shown in FIG. 11B to FIG. 11D, on the other hand, the encrypting/decrypting section 131a in the communication processing section 91a of the I/O processing node 31a has the encryption key K1 for ECI control, the encrypting/decrypting section 131b in the communication processing section 91b of the I/O processing node 31b has the encryption key K2 for AT control, and the encrypting/decrypting section 131c in the communication processing section 91c of the I/O processing node 31c has the encryption key K3 for DBW control.

For instance, when information is to be transmitted from the I/O processing node 31a to the operation control node 21 via the communication line N31, at first, the encrypting/decrypting section 131a encrypts the information to be transmitted using the encryption key K1, and transmits the encrypted information to the operation control node 21 via the communication line N31. The encrypting/decrypting section 121 in the communication processing section 81 of the operation control node 21 selects the encryption key K1 for ECI control, for instance, by referring to the address, decrypts received information using the selected encryption key K1, and transmits the decrypted information to the CPU 41. It should be noted that information to be encrypted may be a body of the information excluding header contents such as address, or may be a portion of the body of the information.

Herein, transmit-receive of information is executed between the operation control nodes 21 to 23 via the communication line N31, and an encryption key corresponding to the operation may be provided. In this case, each of the operation control nodes 21 to 23 has encryption keys for all the nodes. There is obviously, in many cases, a smaller amount of information to be transmitted and received between the operation control nodes 21 to 23, therefore, there is a choice not to encrypt the information to be transmitted and received between the operation control nodes 21 to 23.

The above mentioned encryption/decryption processing employs a common-key cryptosystem in which a local node and a partner node have the same encryption key and encryption and decryption are performed using the same encryption key, but a method is not limited to the method described above, and a public-key cryptosystem may be used. It should be noted that the common-key cryptosystem has a simpler operation for encryption/decryption as compared to that of the public-key cryptosystem, so that a time required for encryption/ decryption is shorter, thus employment of the common-key cryptosystem being preferable for realizing real-time processing.

With Embodiment 7, since information transmitted and received via the communication line N31 is encrypted, it is difficult to decrypt the contents itself of the information even if the information can be intercepted, leakage of and tampering with information can be prevented, which allows safety of the vehicle-control communication system to be enhanced and a vehicle accident to eventually be prevented before it happens.

As described above, with the present invention, a plurality of control function units such as ECI (engine control) and ABS (anti-lock brake system) are divided into a plurality of control function groups; a plurality of I/O processing units execute, within each of the plurality of control function groups, processing that is comparatively light load such as input/output processing to sensors and actuators corresponding to a plurality of control function units within the control function group by a control function unit; and an operation processing unit executes processing requiring high-speed processing within each of the plurality of control function units such as execution of a plurality of operation processing corresponding to the plurality of control function units according to the information inputted from the plurality of I/O processing units and output of each result of the operation processing to the plurality of corresponding I/O processing units respectively; then, within each control function group, a plurality of I/O processing units are connected to an operation processing unit by a first communication unit, while the plurality of control function groups are connected to each other by a second communication unit so that hierarchical communications are realized such that transmit-receive of information within each of the control function groups is performed via the first communication unit and transmit-receive of information between the control function groups is performed via the second communication unit, so that by forming each of the I/O processing units with a low-speed processor and an operation processing unit with a high-speed processor, load distribution is appropriately performed and also development efficiency can significantly be enhanced even under the situation that there frequently come up changes in design such as a partial change in design, addition of a control function, and deletion of a control function because there is characteristics that an I/O processing unit has a processing function specific to the unit while an operation processing unit executes processing similarly between control function groups.

Further, the control function group originally includes a plurality of control function units, and based on the fact that there is a large amount of information transreceived within the control function group while there is a small amount of information transreceived between the control function groups, by forming the first communication unit with a network capable of high-speed communications and the second communication unit with a network capable of low-speed communications, the load on the communication functions is appropriately distributed, so that separation of the I/O processing units from the operation processing unit makes it possible to execute real-time processing even in controls for a vehicle whose high performance is required.

With the invention according to another aspect of the present invention, a first communication unit connects at least two or more of control function groups to each other, and between the connected control function groups, information to be transreceived between control function groups is also transmitted and received via this first communication unit, so that when control function groups having a comparatively close relation and requiring transmit-receive of information therebetween are present in the divided control function groups, a real-time processing for vehicle control can easily and simply be realized without speeding-up of the second communication unit.

With the invention according to another aspect of the present invention, a plurality of control function units are further divided into or integrated into a plurality of I/O processing units for executing input/output processing to sensors and actuators corresponding to the plurality of control function units by the plurality of control function units as well as into a plurality of operation processing units for dividing the plurality of control function units into a plurality of control function groups, executing a plurality of operation processing corresponding to the plurality of control function units according to the information inputted from the plurality of I/O processing units at least belonging to the plurality of divided control function groups, and outputting each result of the operation processing to the plurality of corresponding I/O processing units within the control function group; and the I/O processing units are connected to the operation processing units by one communication unit, and information between the I/O processing units and the operation processing units is transmitted and received via this communication unit, so that by forming each of the I/O processing units with a low-speed processor and an operation processing unit with a high-speed processor, load distribution is appropriately performed to be possible real-time processing in controls for a high-performance vehicle, and also development efficiency can significantly be enhanced even under the situation that there frequently come up changes in design such as a partial change in design, addition of a control function, and deletion of a control function because there is characteristics that an I/O processing unit has a processing function specific to the unit while an operation processing unit executes processing similarly between control function groups, and that the I/O processing units and operation processing units are connected to one communication unit respectively.

Further, since the I/O processing units and operation processing units are connected to one communication unit, arrangement of the I/O processing units and operation processing units can be flexible and also system configuration is simpler because of a small number of wiring, and from this point of view, development efficiency can significantly be enhanced.

With the invention according to another aspect of the present invention, a scheduler adjusts schedules for transmit-receive of information between the plurality of I/O processing units and the plurality of operation processing units to make the system execute efficient communication processing, so that it is possible to reduce wasteful communications made for avoiding collision when there are a plurality of requests to transmit from the I/O processing units and operation processing units, transmit-receive of information can systematically be controlled, and efficient use of the communication line can significantly be enhanced, which allows, resultantly, controls for a vehicle whose high performance is required to be executed in real time.

With the invention according to another aspect of the present invention, a scheduler is provided in any of the plurality of operation processing units to make any of the plurality of operation processing units execute scheduling by the scheduler, so that it is not necessary to provide a particular module with a scheduler function, which allows configuration for connection of the scheduler to a communication unit to be reduced.

With the invention according to another aspect of the present invention, each of I/O processing units and operation control units has at least normal mode to shift to a status of a normal processing operation and maintenance mode to shift to a status of system maintenance, and a scheduler monitors the status of transmission by the plurality of I/O processing units and the plurality of operation processing units, transmits an alarm message using the communication unit to the plurality of I/O processing units and the plurality of operation processing units when any abnormal condition is detected, and shifts the plurality of I/O processing units and the plurality of operation processing units from the normal mode to the maintenance mode to prevent runaway or the like of the I/O processing units and operation processing units before it happens, so that safety of the vehicle-control communication system can be maintained and any vehicle accident or the like due to some trouble of the vehicle-control communication system can be prevented before it happens.

With the invention according to another aspect of the present invention, a format of information to be transmitted and received by the first communication unit, second communication unit, and the communication unit is made common by utilizing a standardized information format, so that even when there comes up a design change such as addition or change of an operation processing unit or an I/O processing unit, the design can easily be changed, which allows a flexible vehicle-control communication system to easily be constructed.

With the invention according to another aspect of the present invention, each of I/O processing units and operation processing units further comprises an identifying unit, which adds identifying information specific to the vehicle-control communication system to information to be transmitted via the first communication unit, second communication unit, and the communication unit, transmits the information, and also performs identification of received information, so that there are vehicles each with the same or the same type of vehicle-control communication system incorporated therein and even when the vehicles each with the same or the same type of vehicle-control communication system incorporated therein happen to be located close to each other, information is transmitted and received by using identifying information specific to each of the vehicle-control communication systems, which allows any vehicle accident or the like due to tampering with the information to be prevented before it happens without interference with each other. In addition, it is also possible to prevent illegal modification to an operation control node or an I/O processing node by an ill-will user.

With the invention according to another aspect of the present invention, each of I/O processing units and operation processing units further comprises an encrypting/decrypting unit, which encrypts information to be transmitted via the first communication unit, second communication unit, and the communication unit using an encryption key, and decrypts the encrypted information, so that even if information transreceived via the first communication unit, second communication unit, and the communication unit can be intercepted, because the information has been encrypted, the contents itself is hard to be decrypted, which results in elimination of leakage of or tampering with information, thus safety of the vehicle-control communication system being enhanced, which resultantly allows a vehicle accident to be prevented before it happens.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle-control communication system for dividing controls for a plurality of devices incorporated in a vehicle to a plurality of prespecified control function units, detecting status information required for controlling the corresponding control function unit by a plurality of sensors by the plurality of control function units, and controlling driving of a plurality of actuators each as a target for control by the corresponding control function unit according to the detected status information and information from the other control function units; wherein the plurality of control function units are divided into a plurality of control function groups; and each of said plurality of control function groups comprises:

a plurality of I/O processing units for executing input/output processing to said sensors and said actuators corresponding to a plurality of control function units in the corresponding control function group by the plurality of control function units;

an operation processing unit for executing a plurality of operation processing corresponding to the plurality of control function units according to the information inputted from the plurality of I/O processing units, and outputting each result of the operation processing to the plurality of corresponding I/O processing units respectively; and a first communication bus for connecting said plurality of I/O processing units to each other and to said operation processing unit; and said plurality of control function groups are connected to each other by a second communication bus for connecting said operation processing units to each other within the plurality of control function groups.

2. The vehicle-control communication system according to claim 1; wherein said first communication unit within the plurality of control function groups connects at least two or more of said control function groups to each other.

3. The vehicle-control communication system according to claim 1; wherein a format of information to be transmitted and received by said first communication unit, said second communication unit, and said communication unit is a standardized information format.

4. The vehicle-control communication system according to claim 1; wherein each of said plurality of I/O processing units and said plurality of operation processing units further comprises an identifying unit for adding identifying information specific to the vehicle-control communication system to information to be transmitted via said first communication unit, said second communication unit, and said communication unit, transmitting the information, and also performing identification of received information.

5. The vehicle-control communication system according to claim 1; wherein each of said plurality of I/O processing units and said plurality of operation processing units further comprises an encrypting/decrypting unit for encrypting information to be transmitted via said first communication unit, said second communication unit, and said communication unit using an encryption key, and decrypting the encrypted information.

6. A vehicle-control communication system for dividing controls for a plurality of devices incorporated in a vehicle to a plurality of prespecified control function units, detecting status information required for controlling the corresponding control function unit by a plurality of sensors by the plurality of control function units, and controlling driving of a plurality of actuators each as a target for control by the corresponding control function unit according to the detected status information and information from the other control function units; said system comprising:
  a plurality of I/O processing units for executing input/output processing to said sensors and said actuators corresponding to the plurality of control function units by said plurality of control function units;
  a plurality of operation processing units for dividing said plurality of control function units into a plurality of control function groups, executing a plurality of operation processing corresponding to said plurality of control function units according to the information inputted from said plurality of I/O processing units at least belonging to the plurality of divided control function groups, and outputting each result of the operation processing to the plurality of corresponding I/O processing units within the control function group; and
  a communication bus for connecting said plurality of I/O processing units to each other and to said plurality of operation processing units.

7. The vehicle-control communication system according to claim 6 further comprising a scheduler for adjusting schedules for transmit-receive of information between said plurality of I/O processing units and said plurality of operation processing units.

8. The vehicle-control communication system according to claim 7; wherein said scheduler is provided in any of said plurality of operation processing units.

9. The vehicle-control communication system according to claim 8; wherein each of said plurality of I/O processing units and said plurality of operation processing units has at least a normal mode to shift to a status of a normal processing operation and a maintenance mode to shift to a status of system maintenance; and
  said scheduler monitors the status of transmission by said plurality of I/O processing units and said plurality of operation processing units, transmits an alarm message using said communication unit to said plurality of I/O processing units and said plurality of operation processing units when any abnormal condition is detected, and shifts said plurality of I/O processing units and said plurality of operation processing units from the normal mode to the maintenance mode.

10. The vehicle-control communication system according to claim 6; wherein a format of information to be transmitted and received by said first communication unit, said second communication unit, and said communication unit is a standardized information format.

11. The vehicle-control communication system according to claim 6; wherein each of said plurality of I/O processing units and said plurality of operation processing units further comprises an identifying unit for adding identifying information specific to the vehicle-control communication system to information to be transmitted via said first communication unit, said second communication unit, and said communication unit, transmitting the information, and also performing identification of received information.

12. The vehicle-control communication system according to claim 6; wherein each of said plurality of I/O processing units and said plurality of operation processing units further comprises an encrypting/decrypting unit for encrypting information to be transmitted via said first communication unit, said second communication unit, and said communication unit using an encryption key, and decrypting the encrypted information.

13. A vehicle control system for controlling plural diverse vehicle functions comprising:
  at least two vehicle control groups, each said control group performing a plural related vehicle functions, each said vehicle control group including,
    a group communication bus;
    at least two control functional units, each control functional unit being connected to said group communication bus, each said control functional unit also communicating with at least a sensor or actuator and performing a vehicle function and having a processor communicating with its associated said sensors and actuators,
    an operation control node, connected to said communication bus and performing operational control of said control functional units, said operation control node having a control node processor and receiving information from and providing information to said control functional units on said group communication bus; and
  the operation control nodes of each said vehicle control group communicating with each other.

14. The vehicle control system of claim 13 wherein said system further comprises a vehicle communication bus interconnecting said operation control nodes of said at least two vehicle control groups to facilitate communication therebetween.

15. The vehicle control system of claim 14 wherein said control node processors are relatively high speed processors and said vehicle communication bus has a relatively high bandwidth and said group communication bus has a relatively low bandwidth.

16. The vehicle communication system of claim 15 wherein each said control functional unit is connected to those sensors and actuators associated therewith and not through a said group communication bus.

17. A vehicle communication system for controlling plural diverse vehicle functions, said system comprising:
  at least two control function groups, each control function group controlling at least two vehicle functions;
  an operation control unit corresponding to each control function group, said operation control unit performing operation control for the corresponding control function group;
  at least two control function units corresponding to each operation control unit, each control function unit providing process controls for the control of a vehicle function;
  an input/output processing unit corresponding to each control function unit, said input/output processing unit receiving process controls from the corresponding control function unit and executing the process controls including generating vehicle control data; and a first communication unit connected between each operational control unit and its corresponding control function units, said first communication unit permitting mutual communication directly between each control function group.

18. The system of claim 17, wherein the first communication unit permits an operation control unit corresponding to a first control group to obtain vehicle control data from an operation control unit of a second control group.

19. The system of claim 17, further comprising:

a second communication unit connected between at least two input/output processing units and said operation control unit; and said operation control unit receiving vehicle control data from each input/output processing unit and directing the vehicle control data to the corresponding control function unit.

20. The system of claim 17, wherein the first communication unit permits each operation control unit to communicate with the other operation control units and access data from the input/output processing units and the control function units.

21. The system of claim 17, wherein said input/output processing units include sensors for obtaining vehicle function data and actuators to adjust vehicle functions into a target range.

22. The system of claim 17, wherein said operation control unit receives vehicle control data from said input/output processing units via said second control unit and directs said vehicle function data to an appropriate control function unit such that there is cooperation between control function units.

23. The system of claim 17, wherein said operation control unit transmits vehicle process control instructions from each control function unit to said corresponding input/output control processing unit via said second communication unit.

24. The system of claim 17, wherein said first communication unit is a communication bus.

25. The system of claim 17, further comprising:

a scheduler connected to the first communication unit, said scheduler for adjusting schedules for transmit-receive of information between said plurality of input/output processing units and said plurality of operation processing units.

26. The system of claim 17, wherein a processor is not connected between any of the control function groups.

* * * * *